United States Patent Office 3,798,229
Patented Mar. 19, 1974

3,798,229
PROCESS FOR PREPARING 1,3,4-THIADIAZOLE-2-THIOL COMPOUNDS
Kazuo Kariyone, Kyoto, Hirokichi Harada, Nishinomiya, Masaru Kurita, Takatsuki, Yutaka Ueda, Toyonaka, Takahiro Furuhashi, Fukuoka, Hitoshi Nakamura, Toyonaka, and Hirotoshi Watanabe, Ikeda, Japan, assignors to Fujisawa Pharmaceutical Co., Ltd., Osaka, Japan
No Drawing. Filed Dec. 8, 1971, Ser. No. 206,192
Claims priority, application Japan, Dec. 30, 1970, 46/129,466
Int. Cl. C07d 91/62
U.S. Cl. 260—302 SD 4 Claims

ABSTRACT OF THE DISCLOSURE

A process for preparing 1,3,4-thiadiazole-2-thiols which comprises reacting a salt of dithiocarbazic acid with ortho-acid esters or with iminoethers or with thio-acid esters.

---

This invention relates to a new process for preparing 1,3,4-thiadizole-2-thiol compounds of the formula:

(I)

wherein $R_1$ is a hydrogen atom or a lower alkyl group and, more particularly, relates to a new proces for preparing the Compound I using, as a starting material, salts of dithiocarbazic acid compound of the formula:

$$H_2N—NH—CSSH \qquad (II)$$

According to this invention, the 1,3,4-thiadiazole-2-thiol Compound I is prepared by reacting a salt of dithiocarbazic acid Compound II with a compound of the formula:

(III)

wherein $R_3$ is a lower alkyl group, $R_4$ and $R_5$ are each a group —$OR_3$ (wherein $R_3$ is as defined above) or both represent a group =NH or =S, X is a sulfur or an oxygen atom (in which X is not a sulfur atom, when $R_4$ and $R_5$ are each a group —$OR_3$ or both of them represent a group =NH) and $R_1$ is as defined above.

As used herein, the term "lower" means a straight or branched carbon chain having up to six carbon atoms, and "alkyl" means methyl, ethyl, propyl, isopropyl, butyl, isobutyl, t-butyl, pentyl or hexyl, preferably the one having one to four carbon atoms.

The Compound I of this invention is a known compound and there is a known process for preparing the same in Chemische Berichte 89 1534–1543 (1956), according to which, for example, 5-methyl-1,3,4-thiadiazole-2-thiol is prepared by (1) reacting thiosemicarbazide with acetic anhydride, (2) heating the resultant acetylthiosemicarbazide, (3) hydrolysing the resultant 2-acetamido-5-methylthiadiazole in the presence of sulfuric acid, (4) reacting the resultant 2-amino-5-methylthiadiazole with sodium nitrite in the presence of hydrogen bromide to obtain 2-bromo-5-methylthiadiazole via the corresponding diazonium salt, (5) reacting the resultant compound with thiourea and finally (6) hydrolyzing the resultant 2-amidinothio-5-methylthiadiazole, and 1,3,4-thiadiazole-2-thiol can be prepared in a similar manner thereto.

This known process has disadvantages that (a) thiosemicarbazide, the starting material therefor, is expensive, (b) it takes the six reaction steps (1)–(6) mentioned above to prepare 5-methylthiadiazole-2-thiol starting from thiosemicarbazide, (c) its reaction procedures are complex and troublesome and (d) the yield of 5-methylthiadiazole-2-thiol is extremely poor, because the intermediates 2-bromo-5-methylthiadiazole and the corresponding diazonium salt are very unstable, and, therefore, the known process is not suitable for industrial application.

This invention overcomes the disadvantages of the known process, and provides a new process whereby the objective Compound I may be obtained in a good yield by a single reaction step.

In carrying out the process of this invention, the salt of the Compound II may be a salt of an alkali metal such as sodium, potassium, etc., or a salt of ammonia, hydrazine, a mono-, di- or tri-(lower) alkyl amine such as mono-, di- or tri-methylamine, mono-, di- or tri-ethylamine, mono-, di- or tri-propylamine, methylethylamine, diethylpropylamine, dimethylisopropylamine, etc. or a heterocyclic amine such as pyridine, α-, β- or γ-picoline, pyrrolidine, N-methylpyrrolidine, imidazolidine, piperidine, N-methylpiperidine, piperazine, etc., and the Compound III may be an ortho-acid ester (III′) which is the compound wherein the symbol $R_1$ is a hydrogen atom or a lower alkyl group, the symbols $R_4$ and $R_5$ are each the group —$OR_3$ and the symbol X is an oxygen atom, an iminoether Compound III″ wherein the symbol $R_1$ is a hydrogen atom or a lower alkyl group, the symbols $R_4$ and $R_5$ represent the group =NH and the symbol X is an oxygen atom; and a thioacid ester (III‴) wherein the symbol $R_1$ is a hydrogen atom or a lower alkyl group, the symbols $R_4$ and $R_5$ represent the group =S and the symbol X is a sulfur or an oxygen atom.

The reaction of the salt of dithiocarbazic acid (II) with the ortho-acid ester (III′) can be carried out in the presence or absence of solvents. As solvent, may be employed methylene dichloride, trichloroethylene and any other solvent inert to the reaction. The reaction temperature is not particularly restricted, and the reaction is usually carried out under warming or under heating up to the boiling point of a solvent to be employed or the reaction mixture to be produced.

The reaction of the salt of dithiocarbazic acid (II) with the iminoether Compound III‴ or its salt may be carried out in the presence of a basic material such as an alkali metal (e.g. sodium, potassium, etc.), a hydroxide or an alkoxide of the alkali metal, or an organic base such as pyridine, α-, β- or γ-picoline, etc. When the basic material is a liquid, it may also act as solvent. The reaction can be carried out in the presence or absence of solvents and, as solvent, may be employed ether, acetonitrile, chloroform, methylene dichloride, trichloroethylene or any other solvent inert to the reaction. The reaction temperature is not particularly restricted and the reaction is usually carried out at room temperature or under heating near or at the boiling point of the solvent to be used. As to the iminoether compound, which is used as a starting material in this reaction, for example, acetoimino ethyl ether hydrochloride may be produced by reacting acetonitrile with ethanol in the presence of hydrogen chloride and other iminoether compounds may be prepared in a similar manner.

The reaction of the salt of dithiocarbazic acid (II) with the thio-acid ester (III‴) is preferably carried out in the presence of a basic material such as an alkali metal (e.g. sodium, potassium, etc.), a hydroxide or an alkoxide of the alkali metal, or an organic base such as pyridine, α-, β- or γ-picoline, etc. and the basic material in liquid may act as solvent. The reaction may be effected in the presence or absence of solvents and, as solvent, may be employed water, methanol, ethanol, dimethylformamide and any other solvent inert to the reaction. The reaction temperature is not particularly restricted and the reaction may be usually carried out at temperature from room temperature to the boiling temperature of the solvent to be used.

EXAMPLE 1

(1) A mixture of triethyl ortho-formate (7.1 g.) and ammonium salt of dithiocarbazic acid (5.0 g.) was heated at 120° C. for 3 hours. The reaction mixture boiled vigorously and then turned into a viscous oil. To this oil was added water (20 cc.) and the mixture was adjusted to pH 1–2 with 10% hydrochloric acid. Precipitated white crystals were collected by filtration, washed with water and dried to give 1,3,4-thiadiazole-2-thiol having M.P. 142 to 144° C.

(2) Triethyl ortho-acetate (7.8 g.) and ammonium salt of dithiocarbazic acid (7.8 g.) were treated in a similar manner to Example 1(1) to give 5-methyl-1,3,4-thiadiazole-2-thiol (3.82 g.) having M.P. 181 to 183° C.

(3) Triethyl ortho-formate (7.5 g.) and triethylammonium salt of dithiocarbazic acid (10.5 g.) were treated in a similar manner to Example 1(1) to give 1,3,4-thiadiazole-2-thiol (3.83 g.), having M.P. 142 to 144° C.

(4) Triethyl ortho-acetate (8.2 g.) and triethylammonium salt of dithiocarbazic acid (10.5 g.) were treated in a similar manner to Example 1(1) to give 5-methyl-1,3,4-thiadiazole-2-thiol (3.8 g.) having M.P. 181 to 183° C.

EXAMPLE 2

(1) (i) Preparation of γ-picoline salt of dithiocarbazic acid

To a mixture of hydrazine-monohydrate (5 g.), γ-picoline (100 g.) and isopropanol (5 cc.), was added dropwise carbon disulfide (7.6 g.) under ice-cooling with stirring. The reaction mixture, which became white muddy and then turned to yellowish white gradually, was stirred for 2 hours under ice-cooling. After the reaction terminated, precipitated crystals were collected by filtration, washed with ether and dried in a desiccator under reduced pressure to give γ-picoline salt of dithiocarbazic acid (17.1 g.).

(ii) Preparation of 5-methyl-1,3,4-thiadiazole-2-thiol

The picoline salt (8.5 g.) obtained above and ethyl acetoimidate hydrochloride (6.2 g.) were suspended in γ-picoline (80 cc.) and the suspension was stirred for 3 hours at 80° C. under preventing the reaction vessel from moisture. The solvent was removed by distillation under reduced pressure and the residue was dissolved in 5% sodium hydroxide aqueous solution (50 cc.). The solution was allowed to stand over night and the insoluble substance was filtered off. The filtrate was adjusted to pH 3.0 with conc-hydrochloric acid and precipitated crystals were collected by filtration, washed with water and dried to give the crystals of 5-methyl-1,3,4-thiadiazole-2-thiol (3.6 g.) having M.P. 178 to 180° C.

(2) (i) Preparation of γ-picoline salt of dithiocarbazic acid

A suspension of γ-picoline salt of dithiocarbazic acid was obtained by treating hydrazine-monohydrate (5.0 g.), carbon disulfide (7.6 g.) and γ-picoline (100 cc.) in a similar manner to Example 2(1)(i).

(ii) Preparation of 5-methyl-1,3,4-thiadiazole-2-thiol

To the suspension obtained above, was directly added ethyl acetoimidate hydrochloride (15 g.), immediately after which the mixture was stirred at 80° C. for 3 hours. The solvent was removed by distillation and the residue was dissolved in 5% sodium hydroxide aqueous solution (100 cc.). The solution was allowed to stand overnight and filtered. To the filtrate was added conc. sulfuric acid and precipitated crystals were collected by filtration and dried to give the crystals of 5-methyl-1,3,4-thiadiazole-2-thiol (8.4 g.) having M.P. 181° C.

(3) (i) Preparation of sodium salt of dithiocarbazic acid

A suspension of sodium salt of dithiocarbazic acid was obtained by stirring a mixture of hydrazine-monohydrate (5.0 g.), carbon disulfide (7.6 g.) and crushed sodium hydroxide (4.0 g.) in γ-picoline (100 cc.) under ice-cooling and then treating the mixture in a similar manner to Example 2(1)(i).

(ii) Preparation of 5-methyl-1,3,4-thiadiazole-2-thiol

The suspension obtained above was added to ethyl acetoimidate hydrochloride (15 g.), and the mixture was heated at 80° C. for 3 hours and treated in a similar manner to Example 2(2)(ii) to give 5-methyl-1,3,4-thiadiazole-2-thiol (8.5 g.) having M.P. 178° C.

(4) (i) Preparation of ethyl acetoimidate hydrochloride and γ-picoline salt of dithiocarbazic acid Hydrogen chloride gas (3.7 g.) was absorbed into ethanol (4.6 g.) dried over molecular-sieves. To the ethanol, was added acetonitrile (4.5 g.) under ice-cooling. The mixture was allowed to stand in ice-water for 2 hours and then in a refrigerator over night to give ethyl acetoimidate hydrochloride. On the other hand, γ-picoline salt of dithiocarbazic acid was obtained by treating a mixture of hydrazine-monohydrate (5.0 g.) and carbon disulfide (7.6 g.) in γ-picoline (100 cc.) in a similar manner to Example 2(1)(i).

(ii) Preparation of 5-methyl-1,3,4-thiadiazole-2-thiol

Thus obtained γ-picoline salt of dithiocarbazic acid and ethyl acetoimidate hydrochloride were treated in a similar manner to Example 2(2)(ii) to obtain 5-methyl-1,3,4-thiadiazole-2-thiol (6.2 g.) having M.P. 160° C.

(5) (i) Preparation of hydrazinium salt of dithiocarbazic acid

To a solution of hydrazine-monohydrate (20 g.) in methanol (64 g.) was added dropwise carbon disulfide (15 g.) at 0–10° C. with stirring. The mixture was stirred at the same temperature for an hour. The pricipitated crystals were collected by filtration to obtain hydrazinium salt of dithiocarbazic acid.

(ii) Preparation of 5-methyl-1,3,4-thiadiazole-2-thiol

To a solution of methyl acetoimidate hydrochloride which was prepared by treating acetonitrile (16 g.), methanol (12 g.) and trichlene (100 cc.) was added hydrazinium salt of dithiocarbazic acid obtained above. The mixture was refluxed under heating for an hour and then trichlene was distilled off. The residue was dissolved in 10% sodium hydroxide aqueous solution, and the aqueous layer was adjusted to pH 4.0 with hydrochloric acid. The precipitated crystals were collected by filtration and recrystallized from methanol to obtain 5-methyl-1,3,4-thiadiazole-2-thiol (13 g.) having M.P. 183 to 184° C.

EXAMPLE 3

(1) To a mixture of ammonium salt of dithiocarbazic acid (1.25 g.) and potassium hydroxide (0.5 g.) in 50% ethanol (20 cc.) was added ethyl dithioacetate (1.2 g.). Thus obtained mixture was stirred at 0 to 5° C. for 30 minutes and further at room temperature for 45 minutes and then refluxed under heating for 3 hours. After the reaction terminated, the ethanol was removed and ethyl ether (70 cc.) was added to the residue. To the aqueous layer separated out was added ethyl ether (100 cc.) and acidified with 10% hydrochloric acid. From the ether layer separated out, the solvent was distilled off and precipitated crystals were collected by filtration washed with petroleum ether and air-dried to give 5-methyl-1,3,4-thiadiazole-2-thiol (1.13 g.) having M.P. 180 to 184° C.

(2) In place of ammonium salt of dithiocarbazic acid, the triethylammonium salt (2.1 g.) was treated in a similar manner to Example 3(1) to give 5-methyl-1,3,4-thiadiazole-2-thiol (1.0 g.) having M.P. 181 to 183° C.

(3) Sodium salt of dithiocarbazic acid prepared from hydrazine-monohydrate (1.1 g.), sodium hydroxide (0.8 g.) and carbon disulfide (1.52 g.), and ethyl dithioacetate (2.4 g.) were treated in a similar manner to Example 3(1) to give 5-methyl-1,3,4-thiadiazole-2-thiol (0.23 g.).

(4) In place of ethyl dithioacetate, ethyl monothioacetate (2.08 g.) was treated in a similar manner to Example 3(1) to give 5-methyl-1,3,4-thiadiazole-2-thiol (0.25 g.).

(5) To a mixture of ammonium salt of dithiocarbazic acid (1.25 g.) and sodium hydroxide (0.4 g.) in 50% ethanol (20 cc.) was added ethyl monothioacetate (1.04 g.). Thus obtained mixture was refluxed under heating for 4 hours. After the reaction terminated, ethanol was distilled off. To the residue was added water (10 cc.) and washed with ethyl ether (100 cc.). The aqueous solution was extracted with ethyl ether (200 cc.), after being adjusted to pH 2 with conc. hydrochloric acid. The ethyl ether layer was dried over sodium sulfate and the solvent was distilled off. The remaining crystals were washed with petroleum ether and air-dried to give 5-methyl-1,3,4-thiadiazole-2-thiol (0.876 g.) having M.P. 178 to 181° C.

The following compounds were obtained in a similar manner to the above Examples 1, 2 and 3.

(1) 1,3,4-thiadiazole-2-thiol having M.P. 143° C.
(2) 5-methyl-1,3,4-thiadiazole-2-thiol having M.P. 184–185° C.
(3) 5-ethyl-1,3,4-thiadiazole-2-thiol having M.P. 76–77° C.
(4) 5-n-propyl-1,3,4-thiadiazole-2-thiol having M.P. 49–51° C.
(5) 5-isopropyl-1,3,4-thiadiazole-2-thiol having M.P. 44–45° C.
(6) 5-isobutyl-1,3,4-thiadiazole-2-thiol having M.P. 56–64° C.
(7) 5-t-butyl-1,3,4-thiadiazole-2-thiol having M.P. 120–121° C.

What is claimed is:

1. A process for preparing 1,3,4 - thiadiazole-2-thiol compounds of the formula:

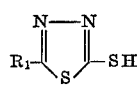

(I)

wherein $R_1$ is a hydrogen atom or a lower alkyl group, which comprises reacting a salt of dithiocarbazic acid compound of the formula:

$H_2NNHCSSH$ (II)

with a compound of the formula:

(III)

wherein $R_3$ is a lower alkyl group, $R_4$ and $R_5$ are each a group —$OR_3$ (wherein $R_3$ is as defined above) or both represent a group =NH or =S, X is a sulfur or an oxygen atom (wherein X is not a sulfur atom, when $R_4$ and $R_5$ are each a group —$OR_3$ or both of them represent a group =NH) and $R_1$ is as defined above.

2. A process for preparing 1,3,4-thiadiazole-2-thiol (I) in the claim 1 which comprises reacting a salt of dithiocarbazic acid (II) with an ortho-acid ester of the formula:

(III′)

wherein $R_1$ is a hydrogen atom or a lower alkyl group, $R_3$ is a lower alkyl group, $R_4$ and $R_5$ are each a group —$OR_3$ (wherein $R_3$ is as defined above) and X is an oxygen atom.

3. A process for preparing 1,3,4-thiadiazole-2-thiol (I) in the claim 1 which comprises reacting a salt of dithiocarbazic acid (II) with an iminoether compound of the formula:

(III″)

wherein $R_1$ is a hydrogen atom or a lower alkyl group, $R_3$ is a lower alkyl group, $R_4$ and $R_5$ represent a group =NH and X is an oxygen atom, or its salt.

4. A process for preparing 1,3,4-thiadiazole-2-thiol (I) in the claim 1 which comprises reacting a salt of dithiocarbazic acid (II) with a thio-acid ester of the formula:

(III‴)

wherein $R_1$ is a hydrogen atom or a lower alkyl group, $R_3$ is a lower alkyl group, $R_4$ and $R_5$ represent a group =S and X is a sulfur or an oxygen atom.

References Cited
UNITED STATES PATENTS
2,744,908   5/1956   Young _____ 260—302 SD

OTHER REFERENCES

Glderfield (ed.), Heterocyclic Compounds, vol. 7, John Wiley & Sons, N.Y., 1961, pp. 598–603 and 612–4.
Katritzky et al. (eds.), Advances in Heterocyclic Chemistry, Academic Press, N.Y., 1968, pp. 190–1 (vol. 9).

RICHARD J. GALLAGHER, Primary Examiner

U.S. Cl. X.R.

260—513.5